US006196464B1

(12) United States Patent
Patterson et al.

(10) Patent No.: US 6,196,464 B1
(45) Date of Patent: Mar. 6, 2001

(54) DOCUMENT ROUTING MECHANISM

(75) Inventors: David L. Patterson, Dundee; Andrew R. B. Halket, Cherry Hinton, both of (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/122,505

(22) Filed: Jul. 24, 1998

(30) Foreign Application Priority Data

Nov. 5, 1997 (GB) .......... 9723300
Jan. 12, 1998 (GB) .......... 9800431

(51) Int. Cl.[7] .......... G06K 13/00
(52) U.S. Cl. .......... 235/477; 235/474; 235/475; 271/303
(58) Field of Search .......... 271/303, 186; 235/477, 475, 474, 485

(56) References Cited

U.S. PATENT DOCUMENTS

| | | | | |
|---|---|---|---|---|
| 4,095,781 | * | 6/1978 | Kistner et al. | 271/12 |
| 4,111,411 | * | 9/1978 | Graves et al. | 271/199 |
| 4,157,822 | * | 6/1979 | Miller | 271/3.1 |
| 4,264,067 | * | 4/1981 | Adams et al. | 271/4 |
| 4,653,647 | * | 3/1987 | Hashimoto | 209/534 |
| 4,699,367 | * | 10/1987 | Russel | 271/65 |
| 4,785,942 | * | 11/1988 | Leijenhorst et al. | 209/657 |
| 4,811,641 | * | 3/1989 | Muller | 83/105 |
| 4,871,125 | * | 10/1989 | Haueter | 242/67.3 R |
| 4,995,747 | * | 2/1991 | Engelhardt et al. | 400/625 |
| 5,179,272 | * | 1/1993 | Ono et al. | 235/476 |
| 5,216,474 | * | 6/1993 | Nakao | 355/319 |
| 5,303,017 | * | 4/1994 | Smith | 355/318 |
| 5,452,786 | * | 9/1995 | Gilmore | 198/367 |
| 5,570,877 | * | 11/1996 | Asami et al. | 271/186 |
| 5,597,996 | * | 1/1997 | Flood | 235/379 |
| 5,673,333 | * | 9/1997 | Johnston | 382/137 |
| 5,899,453 | * | 5/1999 | Middelberg et al. | 271/184 |
| 5,901,953 | * | 5/1999 | Brown, Sr. et al. | 271/184 |
| 5,966,556 | * | 10/1999 | Nakagawa et al. | 399/18 |
| 5,975,273 | * | 11/1999 | Zwahlen et al. | 194/206 |

FOREIGN PATENT DOCUMENTS

| | | |
|---|---|---|
| 0182137 | 5/1996 | (EP) . |
| 2090233 | 7/1982 | (GB) . |
| 9615511 | 5/1996 | (WO) . |
| 9626504 | 8/1996 | (WO) . |

* cited by examiner

*Primary Examiner*—Karl D. Frech
*Assistant Examiner*—J Yven
(74) *Attorney, Agent, or Firm*—Francis L. Conte

(57) ABSTRACT

When selected documents traveling along a first feed path (46) are to be fed to a second feed path (48), a solenoid is energized causing pivotal movement of a pair of flipper arms (56*a,* 56*b*) so as to direct the documents onto the second feed path (48). When the solenoid is de-energized, documents on the first feed path (46) may proceed to the continuation portion thereof i.e., path (46*a*), or documents from the second feed path (48) may be fed to the continuation portion (46*a*) of the first feed path (46). The flipper arms (56*a,* 56*b*) are coupled by gearing mechanisms so that they are moveable relative to each other, pivotal movement of one flipper arm (56*a,* 56*b*) causing pivotal movement of the other arm (56*a,* 56*b*). Such relative movement between the flipper arms (56*a,* 56*b*) allows for a compact and reliable structure and activation of the mechanism is required only when documents are to be fed from the first feed path (46) to the second feed path (48).

16 Claims, 5 Drawing Sheets

DOCUMENT ROUTING MECHANISM

BACKGROUND OF THE INVENTION

The present invention relates to document routing mechanism and in particular, to a document routing mechanism associated with a storage device for currency notes in an automated teller machine (ATM).

Currency notes are generally stored in one or more currency cassettes within the cash dispenser module of an ATM. During a cash withdrawal transaction, the requisite notes must be picked from the appropriate cassette or cassettes by a vacuum or friction picking mechanism and fed along a main transport path to a stacking mechanism, prior to being delivered to a customer through a slot in the front panel of the ATM. In order to increase the speed and efficiency at which currency notes are dispensed to a customer, currency notes may be picked from one or more of the currency cassettes prior to receipt of a customer cash withdrawal request and are transported to one or more auxiliary storage devices (escrows) for temporary storage. The auxiliary storage devices are located along the transport path closer to the stacking mechanism than the currency cassettes and are arranged to dispense currency notes at a faster rate than dispensing from the main currency cassettes. In subsequent cash withdrawal transactions, if at least some of the notes required for the transaction are available in the auxiliary storage devices, these notes are dispensed therefrom in preference to, or in addition to the notes from the currency cassettes.

In order to achieve appropriate routing of the currency notes from the main feed path towards the auxiliary storage device when currency notes are delivered thereto and from the auxiliary storage device to the main feed path when currency notes are dispensed therefrom, a reliable document routing mechanism is required. Since currency notes are commonly picked from a currency cassette at a rate of up to ten notes per second, the document routing mechanism must be suitably responsive so as to provide for the appropriate routing of bank notes traveling at such a speed.

A document routing mechanism for an ATM currency note storage device is described in U.S. Pat. No. 4,871,125. The routing mechanism comprises a pair of curved baffles and a gating mechanism having a core member which can be moved between a first position to define a transport path into the escrow and a second position to define a transport path out of the escrow. The core member is moved by means of an electromagnet and a lever linkage which is connected to the core member. However, this known mechanism is complex and bulky and has a limited operating speed.

SUMMARY OF THE INVENTION

It is an object of the present invention to provide a fast and reliable document routing mechanism of relatively simple construction.

According to the present invention there is provided a document routing mechanism for selectively directing documents traveling along a first feed path to either a second feed path or to a continuation of the first feed path, and for selectively directing documents returning on the second feed path to the continuation of the first feed path, comprising deflecting means for movement within the first feed path and the second feed path and in that the deflecting means comprises a first deflecting means moveable within the first feed path and, a second deflecting means moveable within the second feed path wherein the first deflecting means is moveable relative to the second deflecting means.

The relative movement between the first and second deflecting means allows for a particularly compact and reliable configuration for the document routing mechanism of the present invention.

Preferably, the first and second deflector means are driven for movement by a common drive means. This arrangement allows for simple operation of the routing mechanism so as to achieve the required operating speeds with the required degree of reliability.

The first deflecting means is preferably operatively connected to the second defecting means in such a way that movement of one of the deflecting means cause movement of the other deflecting means.

Each of the first and second deflector means preferably comprises a pivotally mounted document deflection member and may be arranged for relative pivotal movement.

The document routing mechanism of the present invention may be used in connection with a storage device for currency notes in the cash dispenser module of an automated teller machine (ATM) in which the second path represents a feed path to, and delivery path from, the storage device.

BRIEF DESCRIPTION OF THE DRAWINGS

An embodiment of the present invention will now be described, by way of example only, with reference to the accompanying drawings in which.

DETAILED DESCRIPTION

Figure 1:
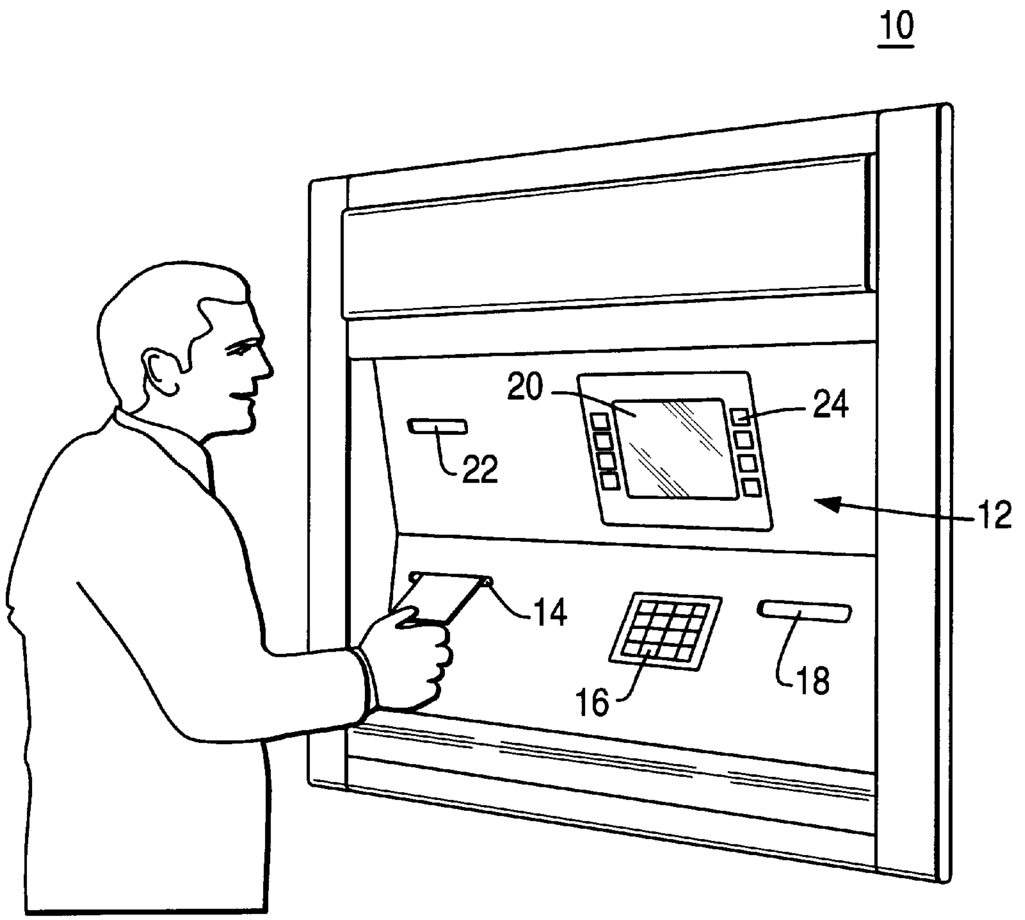
FIG. 1 is an external perspective view of an automated teller machine (ATM) embodying the invention.
Figure 2:
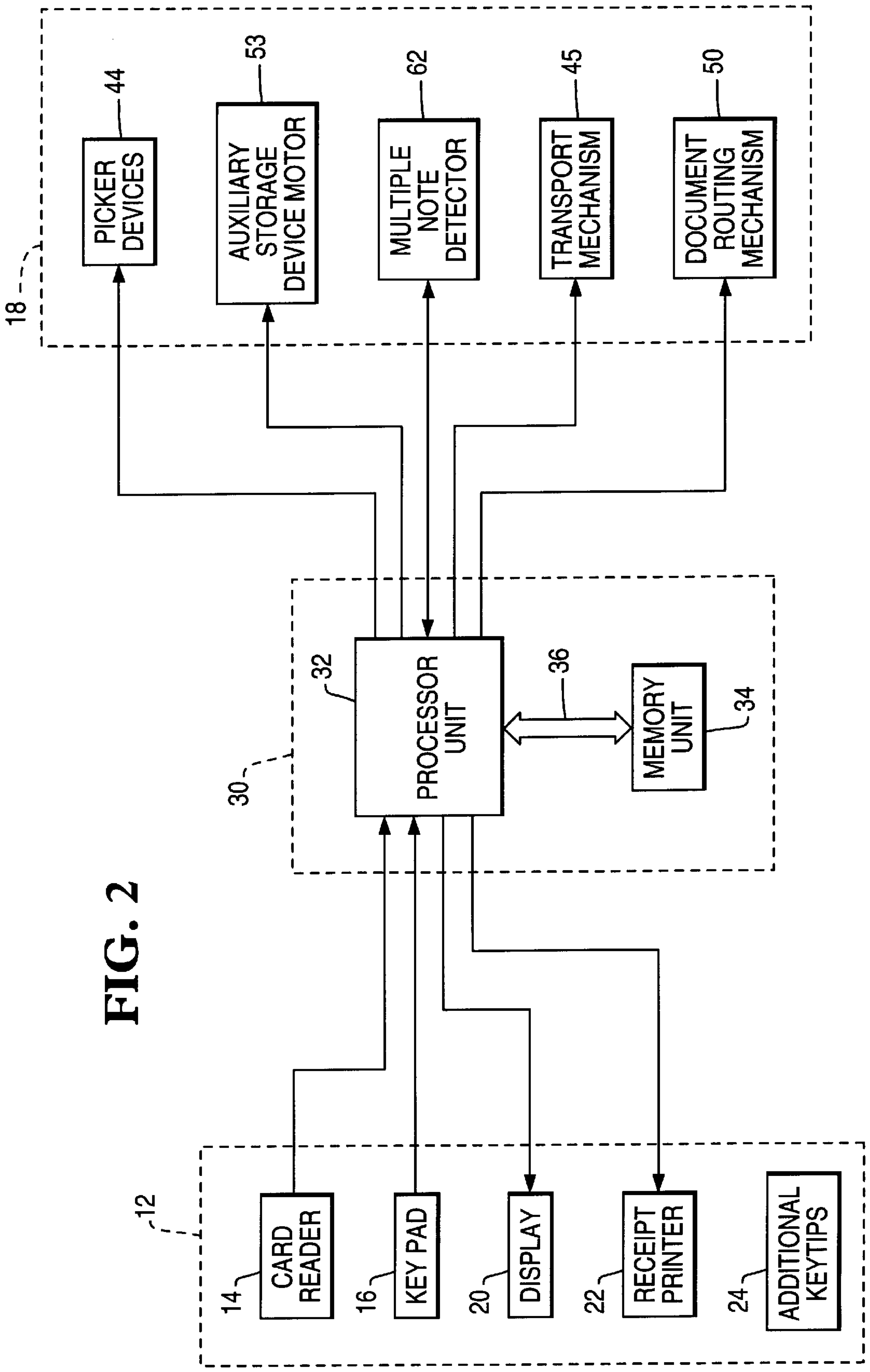
FIG. 2 is a block diagram representation of the ATM of FIG. 1.

Referring to FIGS. 1 and 2, the front of the ATM 10 shown therein is provided with a user panel 12 including a card reader slot 14 for insertion of a user's identification card, a key pad 16, a cash dispenser slot 18 through which currency notes are delivered to a user, a display screen 20, a receipt printer slot 22 through which a receipt for a transaction is delivered to the user at the end of a transaction and additional keytips 24 at the sides of the screen 20 to facilitate selection of options or confirmation of information displayed on the screen 20. The card reader, cash dispenser and receipt printer modules associated with the respective slots 14, 18 and 22 in the user panel 12 of the ATM 10, are designated by the same reference numerals in FIG. 2. In a typical ATM transaction, a user inserts his card into the card reader slot 14 and data encoded on the card is read. Instructions are then displayed on the screen 20. The user is requested to enter a personal identification number (PIN) on the key pad 16 which is verified, usually at a central location remote from the ATM 10. If the PIN is determined to be correct against information read from the inserted card, a menu of the various facilities available to the user is then displayed on the screen 20. If a cash withdrawal facility is selected, the user is requested to enter the sum required on the key pad 16 or by means of the additional keys 24 provided at the side of the screen 20.

The ATM 10 further comprises a controller unit 30 which communicates with components of the user panel 12 and with various other operating mechanisms of the ATM 10. The controller unit 30 includes a processor unit 32, and a memory unit 34 connected via a bus line 36 to the processor unit 32. The processor unit 32 receives input signals from the card reader 14, the key pad 16 and the additional keytips 24, and provides output signals to various mechanisms of the cash dispenser 18, to the display 20 and to the receipt printer 22. It should be understood that the processor unit 32 controls the amount of cash dispensed by the cash dispenser 18, the information displayed on the display 20 and the information printed by the receipt printer 22.

Figure 3:
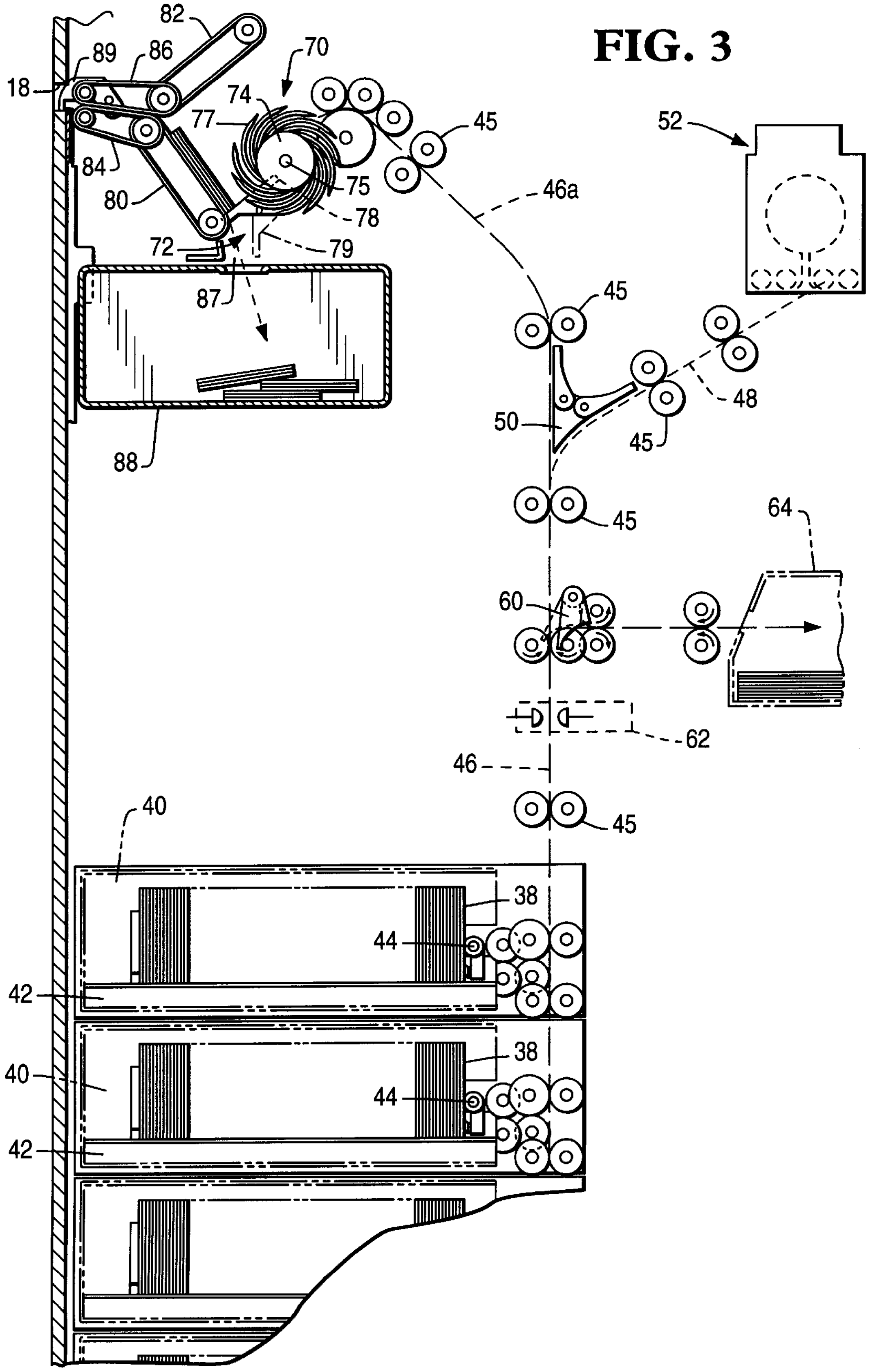
FIG. 3 is a diagrammatic representation of the main operating parts of a cash dispenser of the ATM of FIG. 1.

Referring now additionally to FIG. 3, the various mechanisms within the cash dispenser 18 controlled by the processor unit 32 include a multiple note detector 62 for detecting the presence of multiple superposed currency notes, vacuum operated picker devices 44 for picking notes from currency cassettes 40, a transport mechanism 45 for transporting notes picked from one or more of the cassettes 40 or dispensed from an auxiliary storage device 52, a document routing mechanism 50 for selectively directing picked notes towards the auxiliary storage device 52 for storage and for directing notes dispensed from the auxiliary storage device 52 toward a stacking wheel 70 and a drive motor 53 of the auxiliary storage device 52. The processor unit 32 may include a microcomputer, and the memory unit 34 may be a non-volatile RAM. Suitable computers and memories are readily available in the marketplace. Their structure and operation are well known and therefore will not be described.

The main operating parts of the cash dispenser 18 embodying the invention will now be described with particular reference to FIG. 3. Stacks of currency notes 38 are held in the cassettes 40, the cassettes being slidably mounted in compartments 42 and each holding notes of different denominations. The picker devices 44 serve to extract notes from each cassette 40. The transport mechanism 45 is associated with a three feed paths 46, **46*a* and 48 linked by the document routing mechanism 50 and serves to transfer notes from one location to another within the ATM 10. The document routing mechanism 50 is controlled by the controller unit 30 to pivot between different positions according to the selected path of transport of notes within the ATM 10**.

The transport mechanism 45 transfers notes picked from the cassettes 40 along a first unidirectional main feed path 46, either to a continuation portion of the main feed path 46, i.e. path **46*a*, for delivery to a customer, or to a second feed path 48 for delivery to an auxiliary storage device 52. Documents stored in the auxiliary storage device 52 can be returned to the continuation portion 46*a* of the main feed path 46 by means of the document routing mechanism 50 as will be described later. A diverter 60 is provided along the main feed path 46 to direct any mispicked notes which are detected by the multiple note detector 62 into a first reject bin 64**.

The stacking wheel 70 and a stripper plate assembly 72 are provided at the end of the continuation portion **46*a* of the main feed path 46, for stacking notes prior to being delivered to a customer through a shutter 89 associated with the cash dispenser slot 18 via a series of co-operating belts 80, 82, 84 and 86. The stacking wheel 70 comprises a plurality of stacking plates 74, spaced apart in parallel relationship along the shaft 75 of the stacking wheel 70, each stacking plate 74 incorporating a series of curved tines 77 which pass between fingers 78 of the stripper plate assembly 72 rockably mounted on a shaft 79. A further reject bin 88 is provided for notes which are retracted from the cash dispenser slot 18**, in the event a customer omits to remove them therefrom at the end of a cash withdrawal transaction.

Figure 4A:
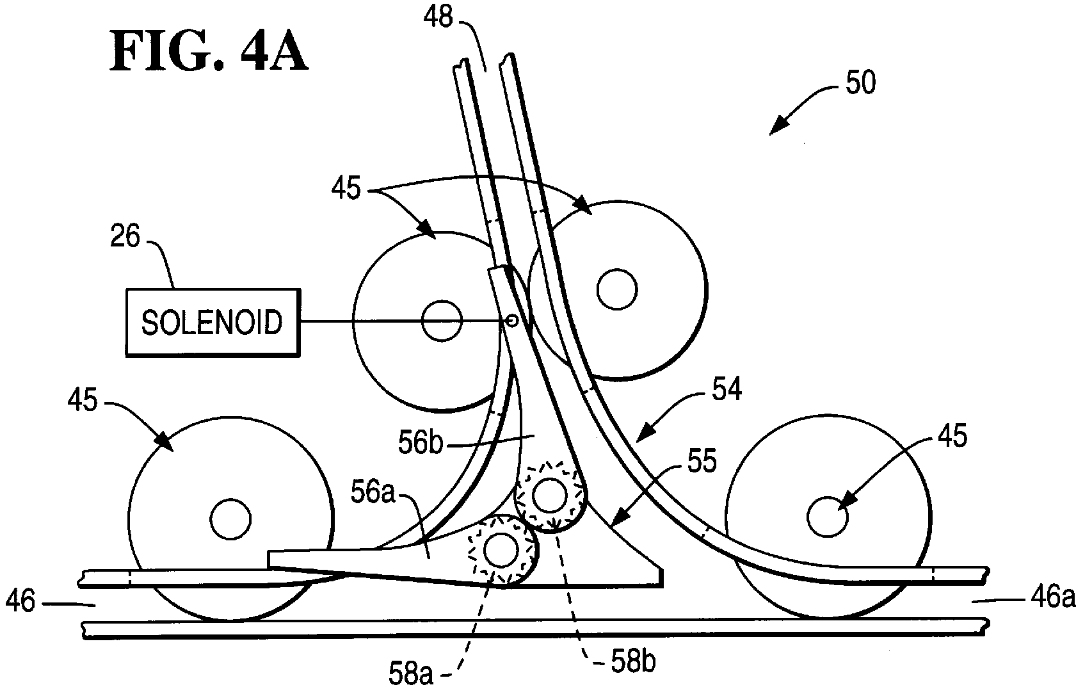
FIGS. 4A and 4B are exploded plan views of a document routing mechanism embodying the present invention, the gating mechanism thereof being shown in its rest position in FIG. 4A and in its activated position in FIG. 4B.
Figure 4B:
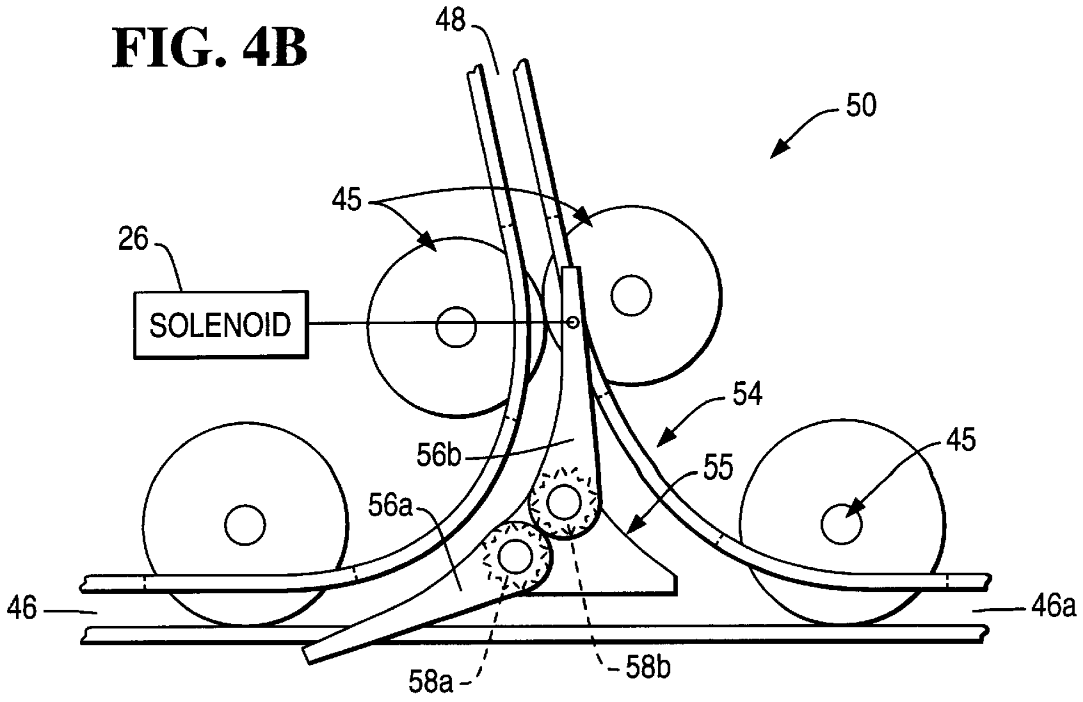

Referring now to FIG. 4A and 4B, the document routing mechanism 50 will be described. The document routing mechanism 50 comprises a gating mechanism 54 at the intersection between the main feed path 46 and the second feed path 48. The gating mechanism 54 includes an isolated support 55 on which first and second flipper arms **56*a* and 56*b* are pivotally mounted. A gearing mechanism 58*a* and 58*b* is provided on the mutually adjacent ends of each of the flipper arms 56*a* and 56*b*, the gear wheels 58*a* and 58*b* of which are arranged to mesh such that pivotal movement of one of the flipper arms 56*a* or 56*b* will cause pivotal movement of the other flipper arm 56*a* or 56*b*. A solenoid mechanism or electromechanical drive means 26 is provided to cause pivotal movement of the flipper arms 56*a* and 56*b***.

Figure 5:
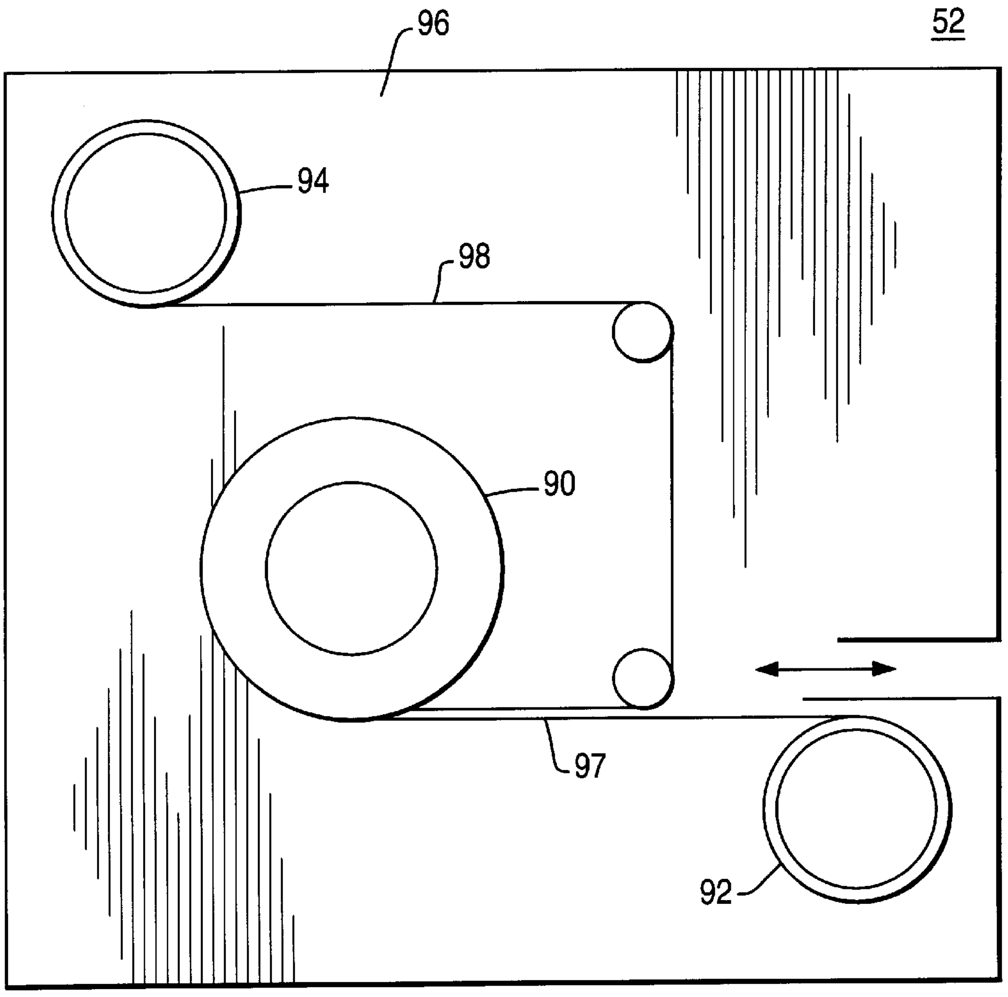
FIG. 5 is a diagrammatic view of an auxiliary storage device which may be used in the cash dispenser of FIG. 3.

The auxiliary storage device 52 is shown in more detail in FIG. 5, but it should be appreciated that the device may take a variety of other physical forms such as, for example, a storage stack. The auxiliary storage device 52 is operated on a "last in first out" (LIFO) basis and is preferably chosen to have less inertia than the currency cassettes 40, so that it can dispense notes at a faster rate than dispensing from the currency cassettes 40. The auxiliary storage device 52 comprises a main storage drum 90, first and second tape feeder drum means 92 and 94 which are rotatably mounted within a housing 96. A first tape 97 is secured at one end to the main storage drum 90 and at its opposite end to the first feeder drum means 92, while a second tape 98 is secured at one end to main storage drum 90 and at its opposite end to the second feeder drum means 94, the tapes 97 and 98 being wound about the main drum 90 and their respective feeder drums means 92 and 94. It should be understood that each tape 97 and 98 could comprise two or more separate tapes spaced apart along the axis of the main storage drum, while each tape feeder drum means 92 and 94 could comprise two or more separate drums spaced apart along a common axis.

In a depositing mode, notes are directed by the document routing mechanism 50 from the main feed path 46 to the second feed path 48 and are fed into the auxiliary storage device 52 where they pass between the tapes 97 and 98. The main drum 90 is driven to rotate in a clockwise direction (with reference to FIG. 4) winding the tapes 97 and 98 and notes held therebetween, onto the main drum 90. Hence, the notes are securely held on the main drum 90 between wrappings of the tapes 97 and 98. In a dispensing mode, the feeder drum means 92 and 94 are driven to rotate in a clockwise direction, causing the tapes 97 and 98 to wind off the main drum 90 and the individual notes to be unloaded and fed out of the auxiliary storage device 52 onto the second feed path 48.

Referring again to FIGS. 3, 4A and 4B, the operation of the ATM embodying the present invention will now be described. In order to increase the efficiency and speed at which notes can be dispensed to a customer, notes are periodically transferred from the currency cassettes 40 to the auxiliary storage device 52. The notes to be transferred are picked from the cassettes 40 by the picker devices 44 and are fed by the transport mechanism 45 along the main feed path 46, the direction of feed of the notes being perpendicular to their long dimensions. If the presence of multiple superposed notes is detected by the detector 62, the diverter 60 is controlled to pivot to a position in which passage of the notes along the main feed path 46 is blocked and the multiple note is directed via rolls 59 into the reject bin 64.

An energization signal is transmitted to the solenoid of the gating mechanism 54 by the controller unit 32. Energization of the solenoid causes pivotal movement of the flipper arm **56*a* in an anticlockwise direction (with reference to FIGS. 4A and 4B) into the first feed path 46 so as to block the passage of documents to continuation portion 46*a* thereof. Pivotal movement of the flipper arm 56*a* causes pivotal movement of the other flipper arm 56*b* in a clockwise direction (with reference to FIGS. 4A and 4B) so as to define a path from the first feed path 46 to the second feed path 48 as is shown in FIG. 4B. The flipper arms 56*a* and 56*b* are retained in the relative positions shown in FIG. 4B under the action of resilient return means (not shown) associated with the solenoid (not shown). In this position, the picked notes are therefore directed from the main feed path 46 to the second feed path 48 and are then fed to the auxiliary storage device 52 for storage. When the transfer process is completed, the solenoid is de-energized causing pivotal movement of the flipper arm 54*a* in a clockwise direction (with reference to FIGS. 4A and 4B), out of the first feed path 46 and the continuation portion 46*a* thereof, and pivotal movement of the flipper arm 54*b* in an anticlockwise direction (with reference to FIGS. 4A and 4B) into the second feed path 48 to the rest position shown in FIG. 4A. It should be understood that the denomination of the notes and the order in which they are transferred to the auxiliary storage device 52 is stored in the memory 34 of the ATM controller unit 30**.

Notes stored in the auxiliary storage device 52 may be dispensed during subsequent customer transactions in preference to, or in addition to, notes from the currency cassettes 40. If at least some of the required notes are available in the auxiliary storage device 52, they are dispensed therefrom on a "last in first out" basis (LIFO) and fed along the second bi-directional feed path 48 towards the gating mechanism 54. The flipper arms **56*a* and 56*b* remain in the rest position shown in FIG. 4A and direct the notes being fed along the second feed path 48 to the continuation portion of the main feed path i.e. path 46*a***.

The notes are then fed along the continuation portion **46*a* of the main feed path towards the stacking wheel 70 to be loaded onto a stationary belt 80. Each note enters between adjacent tines 77 of the stacking plates 74 and is carried partly around the axis of the stacking wheel 70. The notes are stripped from the wheel 70 by the fingers 78 of the stripper plate 72, and are stacked against the belt 80 with a long edge of the note resting on the stripper plate assembly 72. The belt 80 cooperates with a pair of rockably mounted belts 82 (only one of which is shown) which are rocked in a clockwise direction so as to trap the stack of notes between the belts 80 and 82. The belts 80 and 82 are then operated to drive the stacked notes to another pair of belts 84 and 86, which are in turn driven to transport the stack of notes through a shutter 89 to a position where the stack of notes extends through the cash dispenser slot 18 in the user panel 12** of the ATM.

In the event that a customer fails to remove the notes which extend through the cash dispenser slot 18, the notes are retracted back through the shutter 89 on elapse of a predetermined period of time, to avoid the notes being picked up by someone else. The belts 84 and 86 are driven in the reverse direction to carry the retracted notes back onto the belt 80. The stripper plate assembly 72 is rocked into the position shown in chain outline in FIG. 3 and the belts 80 and 82 are operated to feed the stack in a direction opposite to the normal feed direction, the stack of retracted notes being deposited into the reject bin 88 via an opening 87 in the top thereof.

It should be understood that this transfer operation is noticeably faster than the equivalent transfer operation from the currency cassettes 40 to the customer. If it is not possible to complete the customer request from the auxiliary storage device 54, but notes for the transaction are available from the currency cassettes 40, the balance of the request is picked from the appropriate cassettes 40 and are fed along the main feed path 46 in the manner described above. The document routing mechanism 50 remains in the rest position shown in FIG. 4A, allowing the picked notes to proceed along the continuation portion of the main feed path 46, i.e. along feed path **46*a*. The notes are fed towards the stacking wheel 70 and are presented to the customer through the cash dispenser slot 18** in the manner described above.

The present invention provides for a fast, reliable and compact gating mechanism for directing documents towards an auxiliary storage device. The construction of the gating mechanism 54 requires energization of the solenoid only when one of the two positions of the gating arrangement is required. Thus, in normal, i.e. rest, position of the gating arrangement 10 in which the solenoid is not activated, notes may be fed directly from the cassettes 40 to the stacking wheel 70 along the main feed path 46 and the continuation portion thereof, i.e. feed path **46*a*, or from the auxiliary storage device 54 to the stacking wheel 70. Energization of the solenoid is required only when notes are to be transferred from the main feed path 46 to the auxiliary storage device 54**.

It should be appreciated that the document routing mechanism of the present invention is suitable for high-speed document diversion operations, where individual notes passing along a main feed path 46 may be selectively directed to a second feed path 48. In such a case, a pulse is applied to the solenoid at an appropriate instant of time to cause activation of the gating mechanism 54 in the manner described above. Hence, the selected note on the main feed path 46, (a note which is approaching the intersection between the main and second feed paths 46 and 48) is directed to the second feed path 48. On elapse of a predetermined period of time, the solenoid is de-energized causing the gating mechanism 54 to return to the rest position and the note succeeding the selected note on the main feed path 46, to pass to the continuation portion thereof, i.e., to feed path **46*a***.

Further pulses are applied to the solenoid when subsequent selected notes are to be diverted to the second feed path. It should be understood that the instant of time at which a pulse is applied to the solenoid and the duration of the pulse are controlled by the controller unit 30 and will depend on the number of notes traveling along the main feed path and the feed rate of the notes. For example, the pulse must be applied to the solenoid at a time when the selected note is approaching the intersection between the main and second feed paths 46 and 48, but not before the note, if any, preceding the selected note has passed beyond the intersection, so as to avoid the preceding note being directed onto the second feed path 48. Similarly, the solenoid must be de-energized before the note, if any, succeeding the selected note reaches the intersection so as to allow the succeeding note to pass to the continuation portion **46*a*** of the main feed path.

It will be appreciated by those skilled in the art that the invention is not restricted to the details of the foregoing embodiments. For example, the document routing apparatus of the present invention could be provided with any appropriate configuration of document transport paths and there is no need for one of the paths to be associated with an auxiliary storage device.

What is claimed is:

1. A document routing mechanism for selectively directing documents traveling along a first feed path to either a second feed path or to a continuation portion of the first feed path, and for selectively directing documents returning on the second feed path to the continuation portion of the first feed path, the document routing mechanism comprising:

first deflecting means moveable within the first feed path; and second deflecting means moveable within the second feed path, the first deflecting means being moveable relative to the second deflecting means and interconnected therewith by gearing therebetween, the first and second deflecting means cooperating in a first position to deflect movement of a document between the first and second feed paths, and also cooperating in a second position joining together said continuation portion of said first feed path with both said first and second feed paths to direct said documents from said first and second feed paths to said continuation portion of said first feed path.

2. A document routing mechanism according to claim 1, further comprising common drive means for driving the first and second deflecting means for movement.

3. A document routing mechanism according to claim 1, wherein the first deflecting means is operatively connected to the second deflecting means so that movement of one of the first and second deflecting means causes movement of the other one of the first and second deflecting means.

4. A document routing mechanism according to claim 1, wherein the first deflecting means includes a first gearing mechanism and the second deflecting means includes a second gearing mechanism, the second gearing mechanism being arranged to mesh directly with the first gearing mechanism.

5. A document routing mechanism according to claim 1, wherein each of the first and second deflecting means includes a pivotally mounted deflecting member.

6. A document routing mechanism according to claim 1, further comprising electromechanical drive means for driving the first and second deflecting means between a first position in which documents may be directed from the first feed path to the continuation portion of the first feed path or from the second feed path to the continuation portion of the first feed path, and a second position in which documents may be directed from the first feed path to the second feed path.

7. A document routing mechanism according to claim 6, wherein the electromechanical drive means is energized only when documents are to be delivered from the first feed path to the second feed path.

8. An automated teller machine (ATM) comprising:

a currency cassette located along a first feed path and for storing currency notes;

an auxiliary storage device located along a second feed path and for storing currency notes;

a stacker mechanism located along a continuation portion of the first feed path and for stacking currency notes received from either the currency cassette along the first feed path or the auxiliary storage device along the second feed path; and a currency notes routing mechanism for selectively directing currency notes traveling from the currency cassette along the first feed path to either the stacker mechanism along the continuation portion of the first feed path or the auxiliary storage device along the second feed path, and for selectively directing currency notes returning from the auxiliary storage device along the second feed path to the stacker mechanism along the continuation portion of the first feed path;

the currency note routing mechanism including (i) first deflecting means moveable within the first feed path; and (ii) second deflecting means moveable within the second feed path, the first deflecting means being moveable relative to the second deflecting means and interconnected therewith by gearing therebetween, the first and second deflecting means cooperating in a first position to deflect movement of a currency note between the first and second feed paths, and also cooperating in a second position joining together said continuation portion of said first feed path with both said first and second feed paths to direct said currency notes from said first and second feed paths to said continuation portion of said first feed path.

9. An ATM according to claim 8, further comprising common drive means for driving the first and second deflecting means for movement.

10. An ATM according to claim 8, wherein the first deflecting means is operatively connected to the second deflecting means so that movement of one of the first and second deflecting means causes movement of the other one of the first and second deflecting means.

11. An ATM according to claim 8, wherein the first deflecting means includes a first gearing mechanism and the second deflecting means includes a second gearing mechanism, the second gearing mechanism being arranged to mesh directly with the first gearing mechanism.

12. An ATM according to claim 8, wherein each of the first and second deflecting means includes a pivotally mounted deflecting member.

13. An ATM according to claim 8, further comprising electromechanical drive means for driving the first and second deflecting means between a first position in which currency notes may be directed from the first feed path to the continuation portion of the first feed path or from the second feed path to the continuation portion of the first feed path, and a second position in which currency notes may be directed from the first feed path to the second feed path.

14. An ATM according to claim 13, wherein the electromechanical drive means is energized only when currency notes are to be delivered from the first feed path to the second feed path.

15. A document routing apparatus comprising:

first means for feeding documents along a first path;

second means for feeding said documents along a second path;

third means for feeding said documents along a third path;

means for selectively routing said documents at a junction of said three paths, including a first flipper adjoining said first path, and a second flipper adjoining said second path and interconnected by gearing with said first flipper; and said routing means being operable to position said first and second flippers in a first position joining together said first and second paths to direct said documents therebetween, and in a second position joining together said third path with both said first and second paths to direct said documents from said first and second paths to said third path.

16. A routing apparatus according to claim 15 in combination with an automated teller machine (ATM) for dispensing said documents in the form of currency notes to a customer, further comprising:

means operatively joined to said first feeding means for supplying said notes thereto;

means operatively joined to said second feeding means for storing some of said notes; and means operatively joined to said third feeding means for dispensing said notes from said ATM to said customer; and said routing means are effective for periodically routing said notes from said supplying means to said storing means, and routing notes from said storing means to said dispensing means.

* * * * *